June 11, 1957 — O. W. HALING — 2,795,469
PISTON RINGS
Filed Jan. 15, 1954
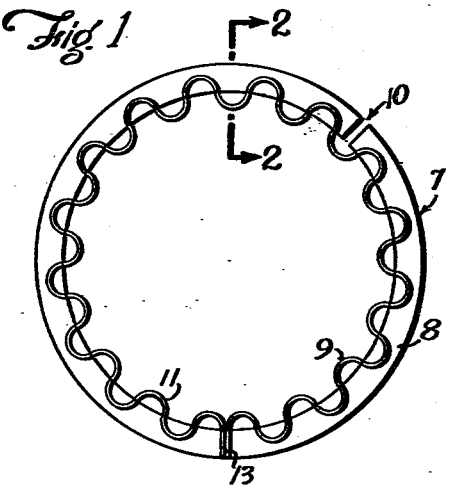
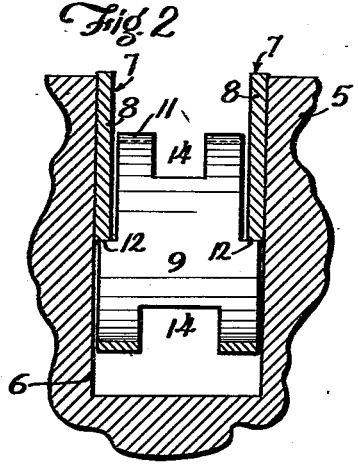
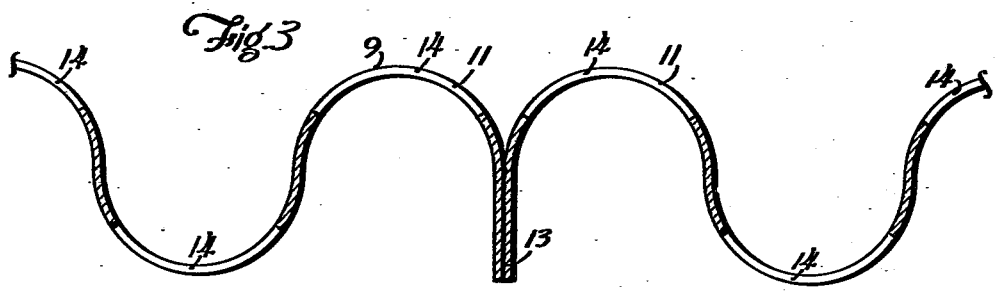
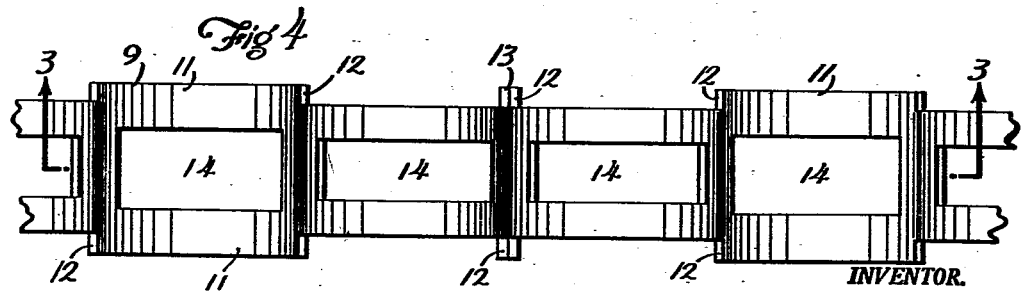
INVENTOR.
Otto W. Haling
BY David K. Kilgore
ATTORNEY

United States Patent Office 2,795,469
Patented June 11, 1957

2,795,469
PISTON RINGS

Otto W. Haling, Rochester, Minn.

Application January 15, 1954, Serial No. 404,236

2 Claims. (Cl. 309—29)

My present invention relates to improvements in piston rings and more specifically to a novel inner ring and spacer structure wherein said structure comprises two relatively thin cylinder contacting segment rails combined with a corrugated annular slotted spacer.

The principal object of my present invention is to provide an inner ring and spacer combination that is highly efficient in its action on the cylinder walls of an internal combustion engine and at the same time being relatively simple to install and inexpensive to manufacture.

In the manufacture of piston rings and their use in motors, it has been found that cylinders into which they fit not only wear tapered but out of round, and distortion due to strain from heating and uneven expansion adds to the out of round. It is therefore desirable to produce piston rings that are flexible to compensate for this condition. In the past, the method used has been to use an inner ring that bears against the bottom of the piston groove and the inner diameter of the ring.

Recently many piston manufacturers have milled out the bottom of the piston groove on two sides, leaving no bearing surface for an inner ring. This therefore calls for a ring, an inner ring or inner ring spacer combination to produce this flexibility that is self-energizing.

It is possible to place a small coil spring under the ring to give the ring tension, but this is very difficult to install. To overcome this difficulty on installation, we have invented a combination inner ring and spacer that is very flexible, the tension of which can be varied. The drainage passages are ample and unobstructed and the inner rings that can be installed without the ends mismatching and doubling up, and an inner ring with many new and unique features, to make it practical to manufacture, practical to use, and one where the points of contact are so numerous that wear does not occur, and long effective life results.

Another advantage of my construction is that the width of the spacer slot can be varied in width to change the spring tension. This is done by milling a slot through the spacer at outer or circular section in various widths to get the proper tension for each ring design specification. This seems to make the spacer flexible but increases the oil drainage as well, and makes the spacer serve as a spring media as well as a spacer to hold the ring segments apart and at the same time support them outwardly, due to the construction shown.

Thus we have an inner ring and spacer combination that makes a very desirable manufacturing unit as it can be crimped, coiled and milled in a continuous strip, an inner ring spacer with a series of reverse humps that alternately act as spacer and inner ring, and one in which the side of said arcs or humps acts as support and multiple tension points for the piston ring segments or rails.

These and other objects of the invention will be apparent from the following description, reference being had to the drawings.

To the above end generally stated the invention consists of the novel device and combination of devices hereinafter described and defined in the claims.

In the accompanying drawings which illustrate the invention, like characters indicate like parts throughout the several views.

Referring to the drawing:

Fig. 1 is a side elevational view of the improved piston ring and spacer with one of its rails removed to fully expose the spacer and spring;

Fig. 2 is a fragmentary view in transverse section taken on the line 2—2 of Fig. 1, on an enlarged scale, and further showing in section, a fragment of a piston having an annular groove in which the improved piston ring is mounted;

Fig. 3 is a fragmentary detail view in circumferential section taken centrally through the spacer and spring on the line 3—3 of Fig. 4; and Fig. 4 is a plan view of the spacer and spring shown in Fig. 3, on the same scale as Fig. 2.

The numeral 5 indicates a conventional piston having the customary external annular piston ring groove 6 that extends circumferentially around said piston.

The improved piston ring 7, which is mounted in the groove 6, includes a pair of thin steel annular rails 8 and a spacer and spring 9. The two rails 8 are laterally spaced apart in parallel arrangement with their axes aligned. Each rail 8 is transversely divided and its end spaced apart to provide a gap 10 that permits expansion and contraction of said rail. This expansion and contraction of the rails 8 permits the piston ring 7 to be moved axially over the piston 5 and into the groove 6. In placing the piston 5 in a cylinder, not shown, the rails 8 are contracted and their outer circumferential edges are yielding pressed against the inner walls of the piston.

The spacer and the spring 9 is annular and formed of a corrugated strip of spring metal that is transversely flat and the corrugations 11 extend circumferential completely around the spacer and spring 9. This spacer and spring 9 extends in a plane between the rails 8 and is axially aligned with said rails.

The medial circumference of the spacer and spring 9 is coincident with the inner circumferential edges of the rails 8. Each corrugation 11 is in the form of two concavo-convex reverse semicircles. The outer portion of the spacer and spring 9 or in other words that portion of the spacer and spring 9 outwardly of its medial circumference extends between the rails 8 and holds the same laterally spaced with a working clearance relative to the sides of the groove 6. The inner portion of the spacer and spring 9 is wider than the outer portion thereof and thus forms shoulders 12 at each longitudinal edge portion of the spacer and spring 9 that engage the inner circumferential edges of the rails 8.

The spacer and spring 9 is transversely divided and its end portions bear flatwise the one upon the other, as indicated at 13, and prevent said end portions from bypassing each other. The shoulders 12 by their engagement with the rails 8 hold the spacer and spring compressed and under strain to expand the rails 8 and press their outer circumferential edge against the inner wall of a cylinder not shown.

Formed in the crown of each corrugation 11, at its transverse center, is a circumferentially extended slot or aperture 14. By varying the width of the slots 14 as well as their length, the flexibility and resiliency of the corrugations 11 may be varied at will. These slots perform another important function and that is to provide for the free drainage of oil.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claims as are stated herein, or required by the prior art.

What I claim is:

1. A piston ring comprising a pair of laterally spaced contractable and expansible annular rails, and a combined annular spacer and spring formed of a strip of spring material having throughout its entire circumference alternate and successive wide and narrow duplicate corrugations, the former being inwardly of the rails and affording the spring and the latter being between the rails and affording the spacer, the junctions between the wide and the narrow corrugations affording pairs of circumferentially spaced shoulders on a medial circumference between the crowns of the wide and narrow corrugations that bear on the inner circumferential edges of the rails, each wide and narrow corrugation having in its crown at its transverse center a relatively wide circumferentially extended slot.

2. The structure defined in claim 1 in which the width of the spring forming corrugations on each side of their slots are wider than corresponding parts of the spacer forming corrugations.

References Cited in the file of this patent

UNITED STATES PATENTS

| | | |
|---|---|---|
| 2,297,104 | Johnson | Sept. 29, 1942 |
| 2,343,942 | Teetor | Mar. 14, 1944 |
| 2,387,084 | McFall et al. | Oct. 16, 1945 |
| 2,436,896 | Mummert et al. | Mar. 2, 1948 |
| 2,635,022 | Shirk | Apr. 14, 1953 |
| 2,637,607 | Olson | May 5, 1953 |